US010225356B2

(12) United States Patent
Li

(10) Patent No.: US 10,225,356 B2
(45) Date of Patent: Mar. 5, 2019

(54) METHOD AND TERMINAL FOR RECEIVING PUSH INFORMATION, STORAGE MEDIUM

(71) Applicants:Juhaokan Technology Co., Ltd., Qingdao, Shandong (CN); HISENSE USA CORPORATION, Suwanee, GA (US); HISENSE INTERNATIONAL CO., LTD., Qingdao, Shandong (CN)

(72) Inventor: Tao Li, Shandong (CN)

(73) Assignees: JUHAOKAN TECHNOLOGY CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 242 days.

(21) Appl. No.: 14/547,599

(22) Filed: Nov. 19, 2014

(65) Prior Publication Data

US 2016/0065682 A1   Mar. 3, 2016

(30) Foreign Application Priority Data

Aug. 28, 2014  (CN) .......................... 2014 1 0432247

(51) Int. Cl.
*H04L 29/08* (2006.01)
*H04L 29/06* (2006.01)

(52) U.S. Cl.
CPC ............ *H04L 67/26* (2013.01); *H04L 67/143* (2013.01); *H04L 69/28* (2013.01)

(58) Field of Classification Search
CPC ...................................................... H04L 67/26
See application file for complete search history.

(56) References Cited

U.S. PATENT DOCUMENTS

| 7,844,677 | B1 * | 11/2010 | Asher | ..................... | H04L 41/06 |
| | | | | | 709/206 |
| 2001/0034224 | A1 * | 10/2001 | McDowell | .............. | H04L 51/04 |
| | | | | | 455/412.1 |
| 2005/0180463 | A1 * | 8/2005 | Jones | ..................... | H04Q 11/04 |
| | | | | | 370/493 |
| 2005/0220034 | A1 * | 10/2005 | Zaniolo | ................... | H04L 47/10 |
| | | | | | 370/252 |
| 2006/0136298 | A1 * | 6/2006 | Klein | ..................... | G06Q 30/02 |
| | | | | | 705/14.54 |

(Continued)

FOREIGN PATENT DOCUMENTS

EP           1724965 A1 * 11/2006  ............ H04M 15/59
KR   20130022929 A   *  3/2013

*Primary Examiner* — Backhean Tiv
(74) *Attorney, Agent, or Firm* — Brinks Gilson & Lione

(57) ABSTRACT

The disclosure discloses an information receiving method, applied for a terminal to receive information pushed by a server, the method including: the terminal listening to a notification message transmitted from the server; the terminal establishing a connection with the server based upon the notification message listened; and the terminal receiving information transmitted from the server over the connection, and upon reception of the information transmitted from the server, the terminal disconnecting the connection immediately or after a preset period of time. The disclosure further discloses a terminal and a storage medium.

17 Claims, 7 Drawing Sheets

(56) References Cited

U.S. PATENT DOCUMENTS

| | | | |
|---|---|---|---|
| 2008/0084272 A1* | 4/2008 | Modiano | G07B 15/063 340/5.2 |
| 2008/0101561 A1* | 5/2008 | Choi | G06Q 10/107 379/88.17 |
| 2008/0126555 A1* | 5/2008 | Rao | H04W 8/245 709/230 |
| 2008/0247344 A1* | 10/2008 | Bahl | H04W 52/0274 370/310 |
| 2009/0204667 A1* | 8/2009 | Diaz | G06F 11/0742 709/203 |
| 2009/0221307 A1* | 9/2009 | Wolak | G06Q 10/10 455/466 |
| 2010/0099421 A1* | 4/2010 | Patel | H04W 80/06 455/450 |
| 2011/0078773 A1* | 3/2011 | Bhasin | H04L 63/0838 726/5 |
| 2011/0207438 A1* | 8/2011 | Sanjeev | H04M 1/274575 455/414.1 |
| 2011/0238734 A1* | 9/2011 | Curry | H04L 51/04 709/203 |
| 2011/0258280 A1* | 10/2011 | Sloan | G06O 30/00 709/207 |
| 2012/0086768 A1* | 4/2012 | Lau | H04N 7/148 348/14.02 |
| 2012/0303774 A1* | 11/2012 | Wilson | H04L 67/26 709/223 |
| 2013/0185245 A1* | 7/2013 | Anderson | G06Q 50/00 706/52 |
| 2013/0324185 A1* | 12/2013 | Zhang | H04W 88/06 455/552.1 |
| 2014/0003372 A1* | 1/2014 | Qian | H04W 8/22 370/329 |
| 2014/0148205 A1* | 5/2014 | Grinshpun | H04L 69/16 455/466 |
| 2014/0237572 A1* | 8/2014 | Zheng | H04W 12/06 726/7 |
| 2014/0302843 A1* | 10/2014 | Lin | H04W 76/11 455/426.1 |
| 2015/0103642 A1* | 4/2015 | Stuart | H04L 41/0631 370/218 |
| 2015/0143041 A1* | 5/2015 | Hattori | G06F 3/0665 711/114 |
| 2015/0181449 A1* | 6/2015 | Didenko | H04W 24/10 455/67.11 |
| 2016/0065682 A1* | 3/2016 | Li | H04L 67/26 709/204 |

* cited by examiner

METHOD AND TERMINAL FOR RECEIVING PUSH INFORMATION, STORAGE MEDIUM

CROSS-REFERENCES TO RELATED APPLICATIONS

This application claims priority to Chinese patent application No. 201410432247.0 filed on Aug. 28, 2014 and titled "INFORMATION RECEIVING METHOD, INFORMATION TRANSMITTING METHOD AND DEVICE", the content of which is incorporated herein by reference in its entirety.

FIELD

The present disclosure relates to the field of communications and particularly to an information receiving method, terminal and storage medium.

BACKGROUND

Information pushing is a technology to publish information by which information, which the user is interested in, is transmitted actively to a terminal of the user.

In order to ensure the information to be pushed to the terminal in time, there are generally two information pushing technologies at present. One of the technologies is an information pushing technology based upon a long connection, that is, the terminal requests a server to establish a connection for pushing information, where the connection is established in the Transmission Control Protocol (TCP) and maintained until the terminal exits. The server pushes the information to the terminal over the connection. The other technology is an information pushing technology based upon long polling that is the terminal requests the server to establish a connection for pushing information, where the connection is established in the TCP, and upon reception of the request, the server doesn't return any response but reserve the connection. The server returns the information to be pushed to the terminal together with response information when there is the information needed to be pushed.

SUMMARY

In an aspect, an embodiment of the disclosure provides an information receiving method, applied for a terminal to receive information pushed by a server, the method including:

listening to, by the terminal, a notification message transmitted from the server;

establishing, by the terminal, a connection with the server based upon the notification message listened; and receiving, by the terminal, information transmitted from the server over the connection, and upon reception of the information transmitted from the server, disconnecting, by the terminal, the connection immediately or after a preset period of time.

In another aspect, an embodiment of the disclosure further provides a terminal including:

one or more processors; and one or more computer readable memories;

wherein the one or more computer readable memories have instruction codes stored therein and the one or more processors execute the instruction codes so that the terminal performs at least the following operations:

listening to a notification message transmitted from a server;

establishing a connection with the server based upon the notification message listened; and receiving information transmitted from the server over the connection, and upon reception of the information transmitted from the server, disconnecting the connection immediately or after a preset period of time.

In still another aspect, an embodiment of the disclosure further provides a computer readable storage medium, including instruction codes stored thereon, the instruction codes are executed to enable a terminal to perform at least the following operations:

listening to a notification message transmitted from a server;

establishing a connection with the server based upon the notification message listened; and receiving information transmitted from the server over the connection, and upon reception of the information transmitted from the server, disconnecting the connection immediately or after a preset period of time.

DETAILED DESCRIPTION OF THE EMBODIMENTS

In methods of receiving and transmitting push information according to embodiments of the disclosure, a terminal disconnects the connection with the server upon reception of push information transmitted from a server; and when the server has information to be pushed, the server transmits a notification message to the terminal and a connection is reestablished between the terminal and the server, so that the terminal may not occupy any TCP resource of the server for a long period of time while the terminal is idle, but when there is push information to be received, the terminal can know this from the notification message transmitted from the server and reestablish the connection in time. Thus the methods of receiving and transmitting push information according to the embodiments of the disclosure can ensure the push information to be transmitted to the terminal and also address the technical problem that the terminal might otherwise have occupied a TCP resource for a long period of time while the terminal were idle without any push information. Thus the terminal may not occupy any TCP resource while the terminal is idle without any push information to thereby improve the utilization ratio of limited TCP resources.

In order to make the embodiments of the disclosure apparent, the embodiments of the disclosure may be described below in details with reference to the drawings.

Figure 1:
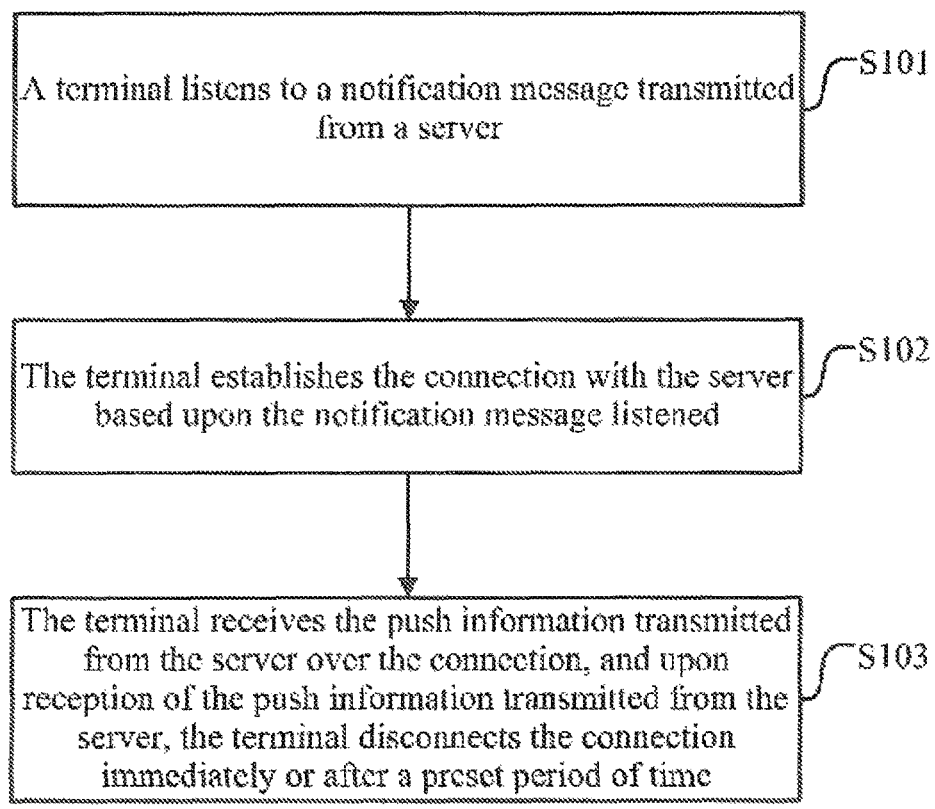
FIG. 1 is a flow chart of general operations of an information receiving method according to an embodiment of the disclosure.

As illustrated in FIG. 1, an information receiving method according to an embodiment of the disclosure generally includes the following operations:

In the operation S101, a terminal listens to a notification message transmitted from a server. In an embodiment of the disclosure, the notification message is transmitted from the server when the server has push information to be transmitted to the terminal and the server detects that the terminal is in an offline status. The push information refers to the information to be pushed from the server to the terminal. A possible scenario of the offline status refers to the absence of a communication pathway based upon a connection oriented protocol, e.g., the absence of a connection based upon the TCP, between the terminal and the server. The terminal can be a mobile phone, a PDA, a tablet computer or another handheld device.

In an embodiment of the disclosure, the notification message transmitted from the serer to the terminal can be a User Datagram Protocol (UDP) message, but of course, can alternatively be a message based upon another protocol, and it may be preferable if it is not necessary to maintain the communication pathway established in the protocol for a long period of time. For example, the notification message can alternatively be a message in the TCP protocol or another protocol message as long as it is not necessary to maintain the TCP connection for a long period of time and the notification message can be transmitted to the terminal timely.

In the operation S102, the terminal establishes the connection with the server based upon the notification message listened. In an embodiment of the disclosure, the establishing connection refers to the establishment of the connection between the terminal and the server based upon the protocol of the connection, e.g., the connection above established based upon the TCP protocol.

In the operation S103, the terminal receives the push information transmitted from the server over the connection, and upon reception of the push information transmitted from the server, the terminal disconnects the connection immediately or after a preset period of time.

The flow above can be performed by the terminal which receives the push information or an apparatus related to the terminal side. It shall be appreciated that when the flow is performed by the apparatus related to the terminal side, actually the terminal and the apparatus related to the terminal side can be considered together as a general terminal, which also falls into the scope of the disclosure. The apparatus related to the terminal side also falls into the scope of the disclosure.

Upon reception of the push information transmitted from the server, the terminal can disconnect the connection after the preset period of time by means of a timer. The following operations can be performed in an embodiment thereof: the terminal starts or resets the timer upon reception of the push information transmitted from the server; if the timer expires, then the terminal disconnects the connection; and if the terminal receives the push information transmitted from the server again over the connection while the timer does not expires, then the terminal resets the timer. A length of timing of the timer can be set to a length of time deemed empirically by a user to be appropriate or the average value of intervals of time at which the server transmits the push information to the terminal.

In an embodiment of the disclosure, the terminal can listen to the notification message transmitted from the server by firstly configuring the identification information of a listening port thereof and transmitting the identification information of the listening port to the server. The server can transmit the notification message to the terminal according to the identification information of the listening port.

In an embodiment of the disclosure, the identification information of the listening port can be any one or combination of the following information: the identification information of the terminal, the IP address of the terminal and the listening port number. For a mobile terminal, for example, the identification information of the terminal can be an International Mobile Equipment Identity (IMEI), and the identification information of the listening port transmitted from the terminal can include an IMEI, an IP address and the listening port number or can only include any one or combination of an IMEI and an IP address. The disclosure may not be limited to the particular type of identification information of the listening port above as long as the transmitted identification information of the listening port can enable the server to transmit the notification message to the mobile terminal. The identification information of each terminal is unique, and the terminal can transmit the changed identification information of the listening port to the server instantly or with a delay when the information is changed.

In an embodiment of the disclosure, after the terminal establishes the connection with the server based upon the notification message listened, the terminal further transmits to the server the status information indicating being online. The terminal transmits to the server the status information indicating being offline before the terminal is disconnected from the server immediately or after the preset period of time. The terminal notifies actively the server of its online or offline status upon being connected to or disconnected from the server, so that the server can know the online status of the terminal and perform a corresponding process of pushing the information according to the online status of the terminal. For example, if the server knows the terminal being offline currently, then the notification message is transmitted to the terminal to trigger the terminal to establish the connection with the server; and if the server knows the terminal being online, then the push information is transmitted to the terminal.

In the method of receiving push information according to this embodiment, upon reception of push information transmitted from a server, a terminal disconnects the connection with the server, and listens to a notification message transmitted from the server to the terminal when there is information in the server to be pushed, and the terminal reestablishes a connection with the server based upon the notification message listened, so that the terminal may not occupy any TCP resource while being idle, but when there is push information to be received, the terminal can know this and reestablish the connection in time upon reception of the notification message transmitted from the server, so as to address the technical problem that the terminal might otherwise have occupied a TCP resource for a long period of time while the terminal were idle without any push information. Thus, the terminal may not occupy any TCP resource while the terminal is idle without any push information to thereby improve the utilization ratio of limited TCP resources.

Figure 2:
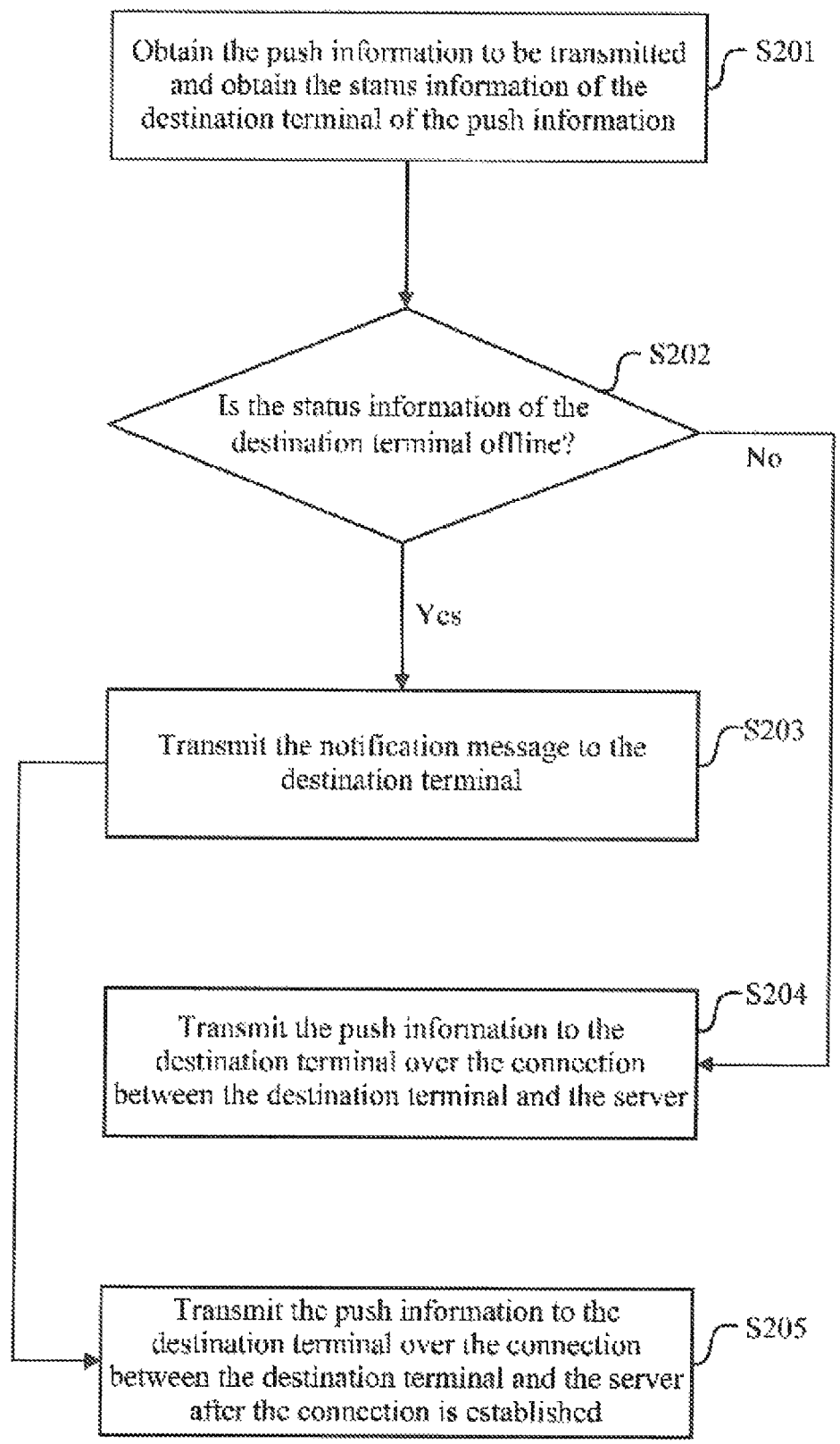
FIG. 2 is a flow chart of general operations of an information transmitting method according to an embodiment of the disclosure.

As illustrated in FIG. 2, the server transmits the push information to the terminal in the information transmitting method according to the embodiment of the disclosure generally in the following operations:

Operation S201: obtain the push information to be transmitted and obtain the status information of the destination terminal of the push information.

The server obtains the push information to be transmitted and the destination terminal corresponding to the push information from a queue of push information to be transmitted, and obtains the status information of the destination terminal. The status information of the terminal is obtained by the server searching a list of services. The push information refers to the information to be pushed from the server to the terminal.

The list of services is maintained by the server. The terminal transmits the status information indicating being online when establishing the connection with the server in response to the notification message transmitted from the server. The server updates the list of services with the received status information indicating that the terminal is online. After the terminal completes the reception of the push information over the connection with the server, the terminal initiates a process of disconnecting the connection with the server. During the disconnecting process, the status information indicating that the terminal is offline is transmitted to the server, and the server updates the list of services with the received status information indicating that the terminal is offline. Furthermore the server can alternatively update the list of services with the status information indicating that the terminal is offline upon detection of the terminal being disconnected, for example, the server sets the online status of the terminal in the list of services to being offline upon detecting by a heartbeat mechanism that the TCP connection with the terminal is disconnected.

Operation S202: judge whether the status information of the destination terminal is offline, and if so, the flow proceeds to the operation S203; otherwise, the flow proceeds to the operation S204.

Operation S203: transmit the notification message to the destination terminal, the notification is used to trigger the destination terminal to establish the connection with the server, and the flow proceeds to the operation S205.

Operation S204: transmit the push information to the destination terminal over the connection between the destination terminal and the server.

Operation S205: transmit the push information to the destination terminal over the connection between the destination terminal and the server alter the connection is established.

Optionally in order to transmit the notification message to the destination terminal in the operation S203, the server further stores the identification information of the listening port in the list of services upon reception of the identification information of the listening port transmitted from the terminal. The identification information of the detection port shall be any one or combination of the following information: the identification information of the terminal, the IP address of the terminal and the listening port number. For a mobile terminal, for example, the identification information of the terminal can be an IMEI, and the identification information of the detection port transmitted from the terminal can include an IMEI, an IP address and the listening port number or can only include any one or combination of an IMEI and an IP address as long as the transmitted identification information of the detection port can enable the server to transmit the notification message to the mobile terminal. The identification information of each terminal is unique, and the terminal can transmit the changed identification information of the listening port to the server instantly when the identification information is changed.

Optionally since push information is generally transmitted at present over a TCP resource, in the information transmitting method according to the embodiment of the disclosure, the connection between the terminal and the server is a TCP connection. In order to save the TCP resource, the server transmits the notification message transmitted from the server to the terminal is a UDP message, which doesn't occupy any TCO resource. Of course, the notification message can alternatively be a TCP message as long as TCP resource would not be occupied for a long period of time.

In the method of transmitting push information according to this embodiment, when there is information to be pushed in the server, the server transmits the notification message to the terminal to trigger the connection to be reestablished between the terminal and the server, so that the terminal may not occupy any TCP resource during a period of time in which there is no push information to be received. When there is push information to be received, the terminal can know this from the notification message in time to thereby reestablish the connection with the server so as to address the technical problem that the terminal might otherwise have occupied a TCP resource for a long period of time while the terminal were idle without any push information. Thus the terminal may not occupy any TCP resource while the terminal is idle without any push information to thereby improve the utilization ratio of limited TCP resources.

Figure 3:
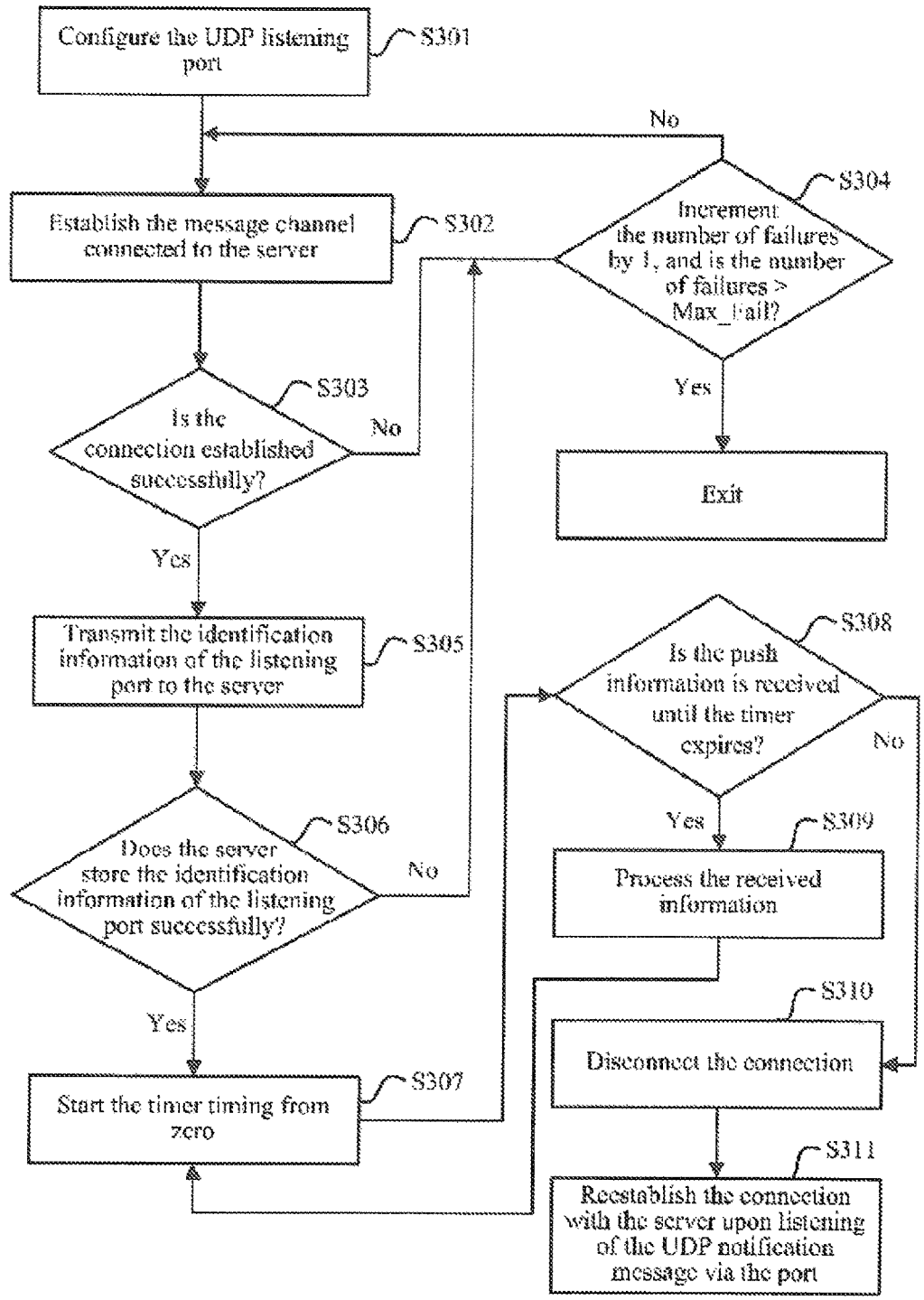
FIG. 3 is a flow chart of an information receiving method according to an embodiment of the disclosure.

FIG. 3 illustrates a flow of an information receiving method according to an embodiment of the disclosure, and cross reference can be made to the relevant description at embodiment illustrated in FIG. 1. In this embodiment, the notification message is embodied as a UDP message, and the push information is transmitted over the connection, which is a TCP connection, between the terminal and the server, and the terminal disconnects the TCP connection after a period of time upon reception of the push information. This flow can include the following operations:

Operation S301: configure the UDP listening port, which is configured to listen to the notification message.

Operation S302: establish the TCP connection to the server.

Operation S303: judge whether the connection is established successfully, and if so, then the flow proceeds to the operation S305; otherwise, the flow proceeds to the operation S304.

The identification information of the listening port is transmitted over the connection, and the identification information of the listening port is further transmitted after the connection is established successfully, so that the success ratio of transmitting the identification information of the listening port can be improved.

Operation S304: increment the number of failures by 1 and to judge whether the number of failures is larger than a preset maximum number of failures Max_Fail, and if so, then the flow exits; otherwise, the flow returns to the operation S302.

The maximum number of failures is preset so that no attempt may be made any more after a number of failures occur, to thereby prevent a connection attempt from being further made when there is a hardware problem or another problem to be manually processed, which may result in a waste of resources.

Operation S305: transmit the identification information of the listening port to the server. The identification information of the listening port includes the identifier of the terminal and the IP address of the terminal and the listening port number. Optionally the status information indicating that the terminal is online is transmitted to the server at this time.

Operation S306: judge whether the information that the server successfully stores the identification information of the listening port has been received, and if so, then the flow proceeds to the operation S307; otherwise, the flow proceeds to the operation S304.

The server storing the identification information of the listening port successfully indicates that the server has interacted with the terminal successfully, and subsequent operations may not be thither performed until the server stores the identification information of the detection port successfully, so as to improve the efficiency of performing this method and to prevent such a situation that the server, which has performed the respective operations, has to perform again the operations already performed because the server has not stored the identification information of the listening port.

Operation S307: start the timer.

Operation S308: monitor whether the push information is received, and if the push information is received before the timer reaches the preset value, then the flow proceeds to the operation S309; if no push information is received until the timer reaches the preset value, then the flow proceeds to the operation S310.

The timer is preset to count a period of time for which the terminal receives no information transmitted from the server, so that there is a balance between the saving of the TCP resource and the ensured pushing of the push information at the highest speed. The connection is disconnected after the connection lasts for a period of time to thereby save the TCP resource, and also the terminal is allowed to occupy some TCP resource until the connection lasts for the period of time to thereby ensure the push information to be transmitted at the highest speed for this period of time.

Operation S309: process the received information, and the flow returns to the operation S307.

Operation S310: disconnect the connection. Optionally the status information indicating that the terminal is offline is transmitted to the server at this time.

Operation S311: upon listening of the UDP notification message via the port, reestablish the connection with the server and receive the push information. Optionally the status information indicating that the terminal is online is transmitted to the server at this time.

Figure 4:
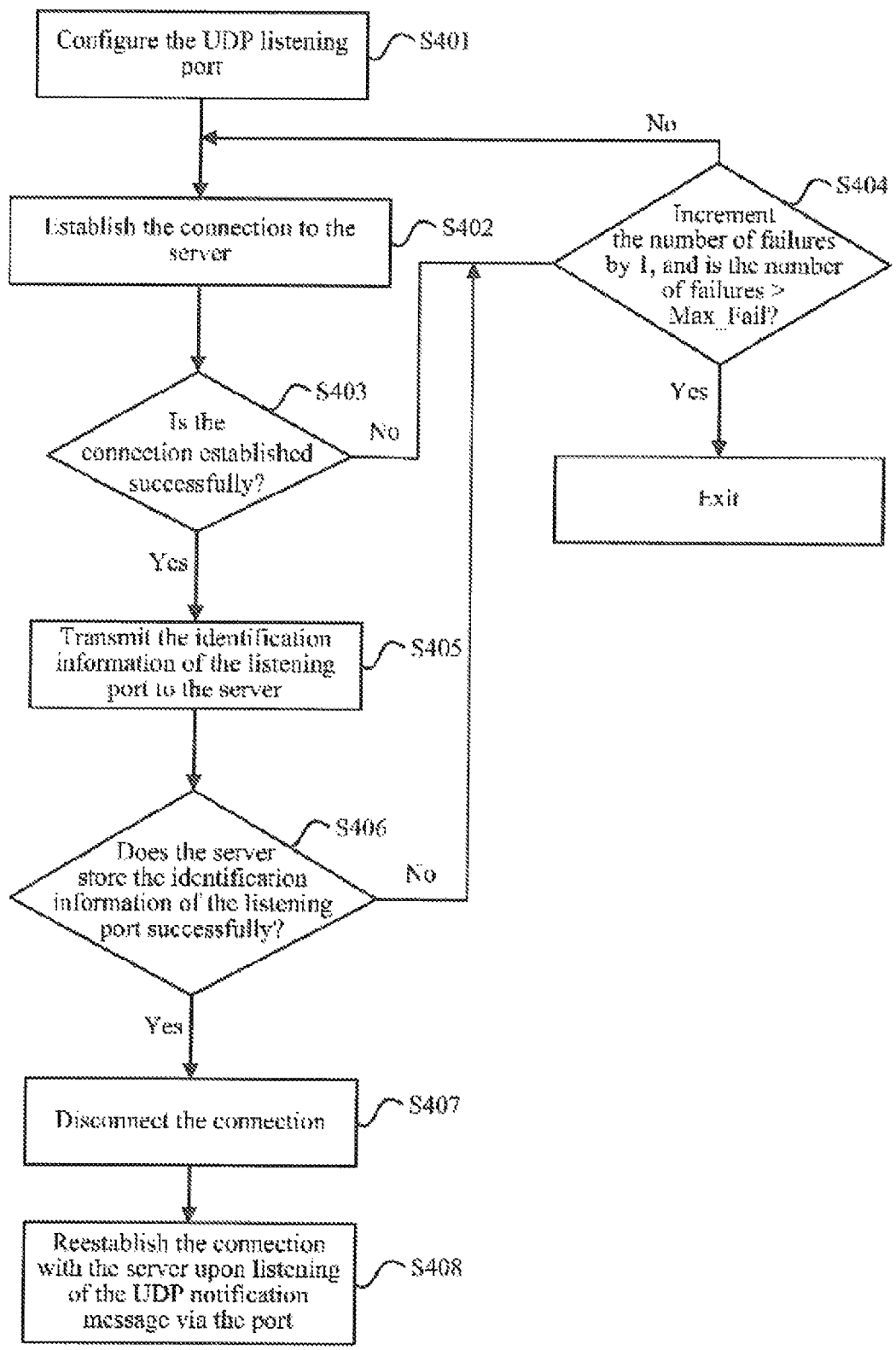
FIG. 4 is a flow chart of an information receiving method according to another embodiment of the disclosure.

FIG. 4 illustrates a flow of an information receiving method according to an embodiment of the disclosure, and cross reference can be made to the relevant description of the embodiment illustrated in FIG. 1. In this embodiment, the notification message is embodied as a UDP message, and the push information is transmitted over the connection, which is a TCP connection, between the terminal and the server, and the terminal disconnects the TCP connection immediately upon reception of the push information. This flow can include the following operations:

Operation S401: configure the UDP listening port.

Operation S402: establish the connection to the server. Optionally thereafter the status information indicating that the terminal is online can be transmitted to the server.

Operation S403: judge whether the connection is established successfully, and if so, then the flow proceeds to the operation S405; otherwise, the flow proceeds to the operation S404.

Operation S404: increment the number of failures by 1 and to judge whether the number of failures is larger than a preset maximum number of failures Max_Fail, and if so, then the flow exits; otherwise, the flow returns to the operation S402.

Operation S405: transmit the identification information of the listening port to the server, where the identification information of the listening port includes any one or combination of: the identifier, the IP address and the listening port number, for example, only the IP address of the terminal or both the identifier and the IP address of the terminal.

Operation S406: judge whether the information that the server successfully stores the identification information of the listening port has been received, and if so, then the flow proceeds to the operation S407; otherwise, the flow proceeds to the operation S404.

Operation S407: disconnect the connection. Optionally the status information indicating that the terminal is offline can be transmitted to the server before this.

The connection is disconnected immediately upon determining that the server stores the identification information of the listening port successfully, so that the TCP resource can be saved as much as possible.

Operation S408: upon listening of the UDP notification message via the port, reestablish the connection with the server and receive the push information.

It shall be noted that in the embodiment above of the disclosure, the TCP resource can be saved as long as no TCP resource is occupied for the notification message in use, so the UDP notification message can be changed to a mobile short message in the embodiment above because the mobile short message occupies no TCP resource.

Figure 5:
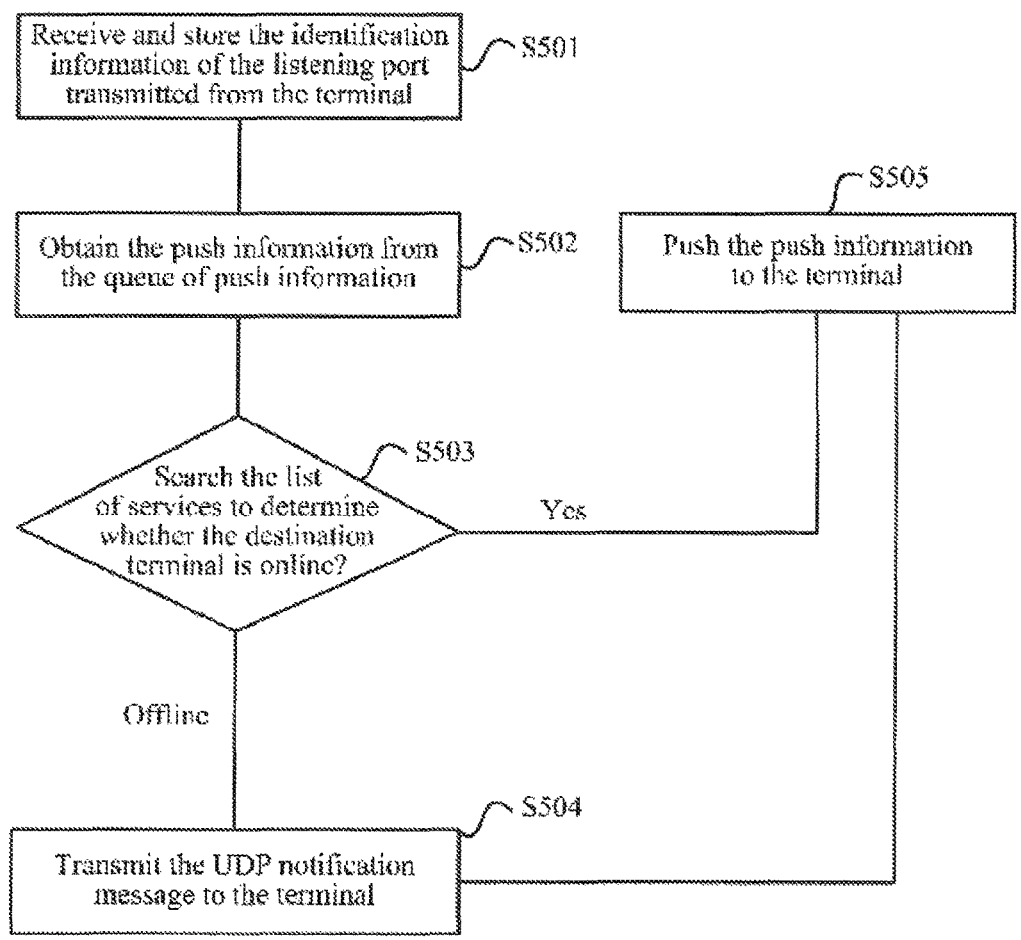
FIG. 5 is a flow chart of an information receiving method according to still another embodiment of the disclosure.

FIG. 5 illustrates an embodiment of an information transmitting method according to the disclosure in which the notification message is embodied as a UDP message in the UDP and the connection established between the server and the terminal is a TCP connection, and this embodiment can be embodied at the server.

Operation S501: receive and store the identification information of the listening port transmitted from the terminal. The identification information of the listening port includes any one or combination of: the identifier and the IP address of the terminal and the listening port number. The stored identification information of the listening port is recorded into the list of services at the server. The identification information of the listening port is stored in the list of services.

Operation S502: obtain the push information from the queue of push information. The queue of push information can store the push information to be transmitted to the terminal or push information previously failing to be transmitted. The push information refers to the information to be pushed from the server to the terminal.

Operation S503: search the list of services for the status information of the destination terminal of the push information. If the destination terminal is online, then the flow proceeds to the operation S505; otherwise, that is if the destination terminal is offline, then the flow proceeds to the operation S504. In this operation, the status information of the terminal in the list of services can be transmitted from the terminal, wherein the terminal transmits to the server the status information indicating that the terminal is online after establishing the connection with the server, and the terminal transmits to the server the status information indicating that the terminal is offline before disconnecting the connection with the server. The status information of the terminal in the list of services can alternatively be updated by the server on its own, where the server updates the status information of the terminal to being online upon reception of the identification information of the listening port transmitted thereto from the terminal and updates the status information of the terminal to being offline upon reception of a request transmitted thereto from the terminal to disconnect the connection.

Operation S504: transmit the UDP notification message to the terminal and to store the push information in an information buffer area.

Operation S505: transmit the push information to the terminal.

Based upon the same technical idea, an embodiment of the disclosure further provides a message receiving apparatus which can perform the embodiment of the message receiving method above. The information receiving apparatus according to the embodiment of the disclosure is as illustrated in FIG. 6.

Figure 6:
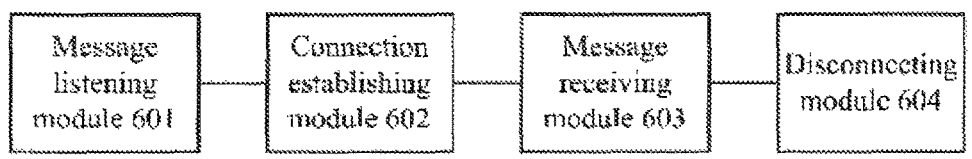
FIG. 6 is a block diagram of an information receiving apparatus according to an embodiment of the disclosure.

As illustrated in FIG. 6, an embodiment of the disclosure provides an information receiving apparatus applicable to the terminal side, including: a notification message listening module 601 configured to listen to a notification message transmitted from a server when the server has push information to be transmitted to the terminal and detects that the terminal is in an offline status; a connection establishing module 602 configured to establish a connection with the server based upon the notification message listened; a message receiving module 603 configured to receive the push information transmitted from the server over the connection; and a disconnecting module 604 configured to disconnect the connection immediately or after a preset period of time upon reception of the push information transmitted from the server.

Optionally the disconnecting module 604 is particularly configured to start or reset a timer after the terminal receives the push information transmitted from the server; and To disconnect the connection if the timer expires; or To reset the timer if the tinier does not expires and the terminal receives again the push information transmitted from the server over the connection.

Optionally the notification message listening module 601 is further configured to configure a listening port and to transmit the identification information of the listening port to the server, where the identification information includes any one or combination of the following information: the identification information of the terminal, the IP address of the terminal and listening port number.

Optionally the connection establishing module 602 is further configured to transmit status information indicating being online to the server after the terminal establishes the connection with the server based upon the notification message listened; and The disconnecting module 604 is further configured to transmit status information indicating being offline to the server before the terminal disconnects the connection with the server immediately or after the preset period of time upon reception of the push information transmitted from the server.

Optionally in the technical solution above, the connection, established by the connection establishing module, with the server is a TCP connection, and the message listened by the notification message is a UDP message.

Based upon the same technical idea, an embodiment of the disclosure further provides an information transmitting apparatus which can perform the embodiment of the information transmitting method above. The information transmitting apparatus according to the embodiment of the disclosure is as illustrated in FIG. 7

Figure 7:
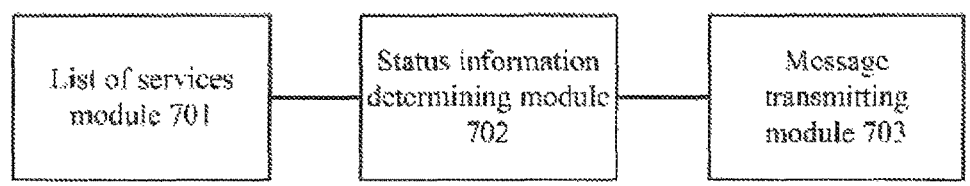
FIG. 7 is a block diagram of an information transmitting apparatus according to an embodiment of the disclosure.

As illustrated in FIG. 7, an embodiment of the disclosure pro ides an information transmitting apparatus including: a list of services module 701 configured to record and update status information of a terminal in a list of services according to status information transmitted from the terminal, where the terminal transmits status information indicating being online when the terminal establishes a connection with a server in response to a notification message transmitted from the server; and the terminal transmits status information indicating being offline when the terminal disconnects the connection with the server upon reception of push information transmitted from the server;

A status information determining module 702 is configured to search the list of services for the status information of the destination terminal; and A message transmitting module 703 is configured to transmit the notification message to the destination terminal if the server searches out the status information of the destination terminal as being offline, wherein the notification message is configured to trigger the destination terminal to establish the connection with the server, and the server transmits the push information to the destination terminal over the connection with the server after the destination terminal establishes the connection; and To transmit the push information to the destination terminal over the connection between the destination terminal and the server if the server searches out the status information of the destination terminal as being online.

Optionally the list of services module 701 is further configured to store the identification information of a listening port transmitted from the terminal in the list of services upon reception of the identification information of the listening port, where the identification information includes any one or combination of the following information: the identification information of the terminal, the IP address of the terminal and the listening port number.

Optionally the connection over which the message transmitting module transmits the push information is a TCP connection, and notification message transmitted by the message transmitting module is a UDP message.

Figure 8:
FIG. 8 is a block diagram of an information receiving device according to an embodiment of the disclosure.

As illustrated in FIG. 8, an embodiment of the disclosure provides an information receiving device including: a radio frequency signal transceiver 801, a processor 802, a memory 803 and a bus interface 804. The bus interface 804 is configured to connect the processor 802, the memory 803 and the radio frequency transceiver 801 with each other, and the memory 803 stores instruction codes, where when the instruction codes are executed by the processor 802, the processor 802 controls the radio frequency signal transceiver 801 to listen to a notification message transmitted from a server, the notification is transmitted when the server has push information to be transmitted to a terminal and detects that the terminal is in an offline status, controls the radio frequency signal transceiver 801 to establish a connection with the server in response to the notification message listened to by the radio frequency signal transceiver 801 and controls the radio frequency signal transceiver 801 to disconnect the connection immediately or after a preset period of time after the radio frequency signal transceiver 801 receives the push information transmitted from the server. The memory 803 can further store the push information, transmitted from the server, received by the radio frequency signal transceiver 801 over the connection.

Optionally after the radio frequency signal transceiver 801 receives the push information transmitted from the server, the processor 802 starts or resets the timer, and lithe timer expires, then the processor 802 controls the radio frequency signal transceiver 801 to disconnect the connection. If the timer does not expires and the radio frequency signal transceiver 801 receives again the push information transmitted from the server over the connection, then the processor 802 resets the timer.

Optionally the processor 802 further configures a listening port and transmits the identification information of the listening port to the server through the radio frequency signal transceiver 801, where the identification information includes any one or combination of the following information: the identification information of the terminal, the IP address of the terminal and the listening port number.

Optionally after the processor 802 controls the radio frequency signal transceiver 801 to establish the connection with the server in response to the notification message received by the radio frequency signal transceiver 801, the processor 802 controls the radio frequency signal transceiver 801 to transmit status information indicating being online to the server, and after the radio frequency signal transceiver 801 receives the push information transmitted from the server, before the processor 802 controls the radio frequency signal transceiver 801 to disconnect the connection with the server immediately or after a preset period of time, the processor 802 controls the radio frequency signal transceiver 801 to transmit status information indicating being offline to the server.

Optionally the processor 802 controls the radio frequency signal transceiver 801 to establish the connection, which is a TCP connection, with the server, and die listening port listens to a UDP message.

Figure 9:
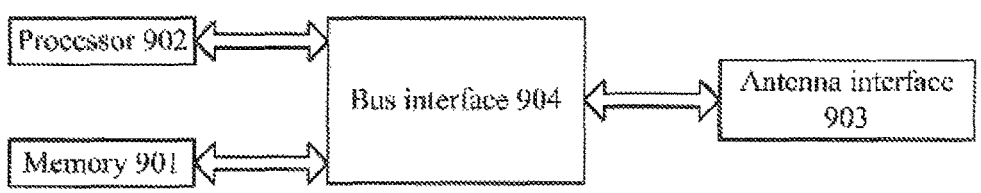
FIG. 9 is a block diagram of an information transmitting device according to of an embodiment the disclosure.

As illustrated in FIG. 9, an embodiment of the disclosure provides an information transmitting device including: a memory 901, a processor 902, an antenna interface 903 and a bus interface 904. The bus interface 904 is configured to connect the processor 902, the memory 901 and the bus interface 903 with each other, and the memory 901 stores instruction codes, where when the instruction codes are executed by the processor 902, the processor 902 obtains a push information to be transmitted and status information of a destination terminal of the push information. If the status information of the destination terminal is offline, then the processor 902 controls the antenna interface 903 to transmit a notification message to the destination terminal which triggers the destination terminal to establish a connection with the server. After the connection is established with the destination terminal via the antenna interface 903, the processor 902 controls the antenna interface 903 to transmit the push information to the destination terminal over the connection. If the status information of the destination terminal is online, then the processor 902 controls the antenna interface 903 to transmit the push information to the destination terminal over the connection between the destination terminal and the server.

Optionally the memory 901 can further store a list of services, and the processor 902 records and updates the status information of the terminal in the list of services in the memory 901 according to the status information, transmitted from the terminal, received via the antenna interface 903. The terminal transmits the status information indicating being online when the terminal establishes the connection with the server in response to the notification message transmitted from the serer and the terminal transmits the status information indicating being offline after the terminal disconnects the connection with the server upon reception of the push information transmitted from the server.

Optionally the antenna interface 903 receives the identification information of a listening port transmitted from the terminal, and the processor 902 stores the identification information of the listening port in the list of service in the memory 901, where the identification information includes any one or combination of the following information: the identification information of the terminal, the IP address of the terminal and the listening port number.

Optionally the connection, which is a TCP connection, is established with the terminal, and the processor 902 controls the notification message, which is a UDP message, to be transmitted.

The signal processing device here can be embodied in various implementations. For example, these technologies can be embodied in hardware, software or a combination thereof. For an implementation in hardware, a processor of an apparatus (e.g., the processors 802 and 902 illustrated in FIG. 8 and FIG. 9) can be embodied in one or more Application Specific Integrated Circuits (ASIC), Digital Signal Processors (DSP), Digital Signal Processing Devices (DSPD), Programmable Logic Devices (PLD), Field Programmable Gate Arrays (FPGA), processors, controllers, microcontrollers, microprocessors and other electronic units designed to perform the functions described here or a combination thereof.

For an implementation in software, these technologies can be embodied in modules (e.g., programs, functions, etc.) performing the functions described here. The software codes can be stored in the memory and executed by the processor. The memory can be embodied internal or external to the processor.

Figure 10:
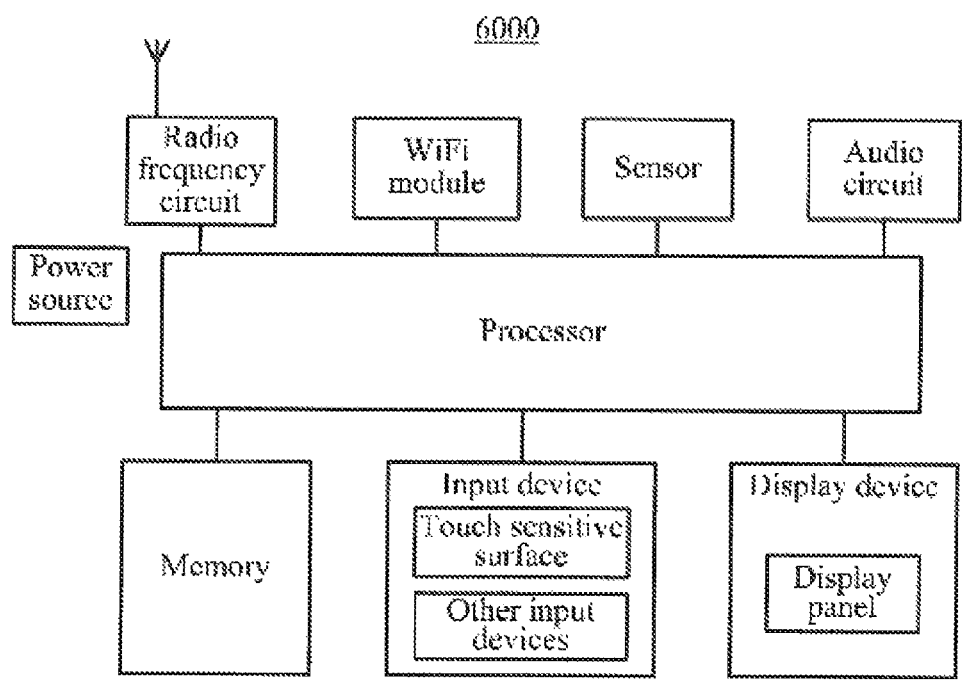
FIG. 10 is a schematic structural diagram of a terminal according to of an embodiment the disclosure.

As illustrated in FIG. 10, a terminal 6000 can be any one of various handheld devices (e.g., a mobile phone, a tablet computer, a PDA, etc.) which can include a processor including one or more processing cores, a radio frequency circuit, a memory including one or more computer readable storage mediums, an input device, a display device, a sensor, an audio circuit, a WiFi module, a power source and other components. Those skilled in the art can appreciate that the terminal 600 will not be limited to the structure in this embodiment but can include more or less components or have some of the components combined or different components arranged, where:

The radio frequency circuit can be configured to receive and transmit a signal during receiving and transmitting information or in communication, particularly, the radio frequency circuit transfers downlink information of a base station to the one or more processors for processing upon reception of the downlink information; and also transmits uplink data to the base station. Typically the radio frequency circuit includes but will not be limited to an antenna, at least one amplifier, a tuner, one or more oscillators, a Subscriber Identifier Module (SIM) card, a transceiver, a coupler, a Low Noise Amplifier (LNA), a duplexer etc. Moreover the radio frequency circuit can further communicate with a network and another device through wireless communication. The wireless communication can comply with any of communication standards or protocols including but not limited to the GSM (Global System of Mobile communication), the GPRS (General Packet Radio Service), the CDMA (Code Division Multiple Access), the WCDMA (Wideband Code Division Multiple Access), the LTE (Long Term Evolution), an e-mail, the SMS (Short Messaging Service), etc.

The memory can be configured to store software programs and modules, and the processor is configured to run the software programs and modules stored in the memory to thereby perform various function applications and data processing. The memory can generally include a program storage area and a data storage area, where an operating system, applications required for at least one function (e.g., a function for playing audio, a function for displaying image, etc.), etc., can be stored in the program storage area and data created for use of the terminal 6000 (e.g., audio data, an address book etc.), etc., can be stored in the data storage area. Moreover the memory can include a high-speed random access memory and can further include a nonvolatile memory, e.g., at least one magnetic-disk memory device, a flash memory device or another volatile solid-state memory device. Correspondingly the memory can further include a memory controller configured to provide an access of the processor and the input device to the memory.

The input device can be configured to receive input digital or character information and to generate a keyboard, mouse, joystick, optical or track ball signal input related to user setting and function control. Particularly the input device can include a touch sensitive surface and another input device. The touch sensitive surface, also referred to as a touch display screen or a touch control panel, can be configured to collect a touch operation by a user thereon or in proximity thereto (e.g., an operation by the user on or in proximity to the touch sensitive surface using his or her finger, a stylus or any other appropriate object or attachment) and to drive a corresponding connected device by preset program. Optionally the touch sensitive surface can include two components which are a touch detection device and a touch controller, where the touch detection device detects the position of touching by the user, detects a signal as a result of the touch operation and transfers the signal to the touch controller; and the touch controller receives the touch signal from the touch detection device and converts it into coordinates of a touch point and further transfers them to the processor and can receive and execute a command sent from the processor. Moreover the touch sensitive surface can be embodied in various types of resistive, capacitive, infrared, surface sound wave and other types. The input device can further include another input device in addition to the touch sensitive surface. Particularly the other input device can include but not be limited to one or more of a physical keyboard, functional keys (e.g., volume control press keys, a power-on or -off press key, etc.), a track ball, a mouse, a joystick, etc.

The display device can be configured to display information input by the user or information provided to the user and various graphic user interfaces of the terminal 6000, where these graphic user interfaces can be composed of graphics, texts, icons, videos and any combination thereof. The display device can include a display panel which can be optionally configured in the form of a Liquid Crystal Display (LCD), an Organic Light-Emitting Diode (OLED) display, etc. Furthermore the touch sensitive surface can cover the display panel, and the touch sensitive surface, upon detection of the touch operation thereon or in proximity thereto, transfers it to the processor to determine the type of the touch event, and thereafter the processor provides a corresponding visual output on the display panel according to the type of the touch event. Although the touch sensitive surface and the display panel are embodied in this embodiment as two separate components to perform the input and output functions, the touch sensitive surface and the display panel can be integrated to perform the input and output functions in some embodiments.

The terminal 6000 can further include at least one sensor, e.g., an optical sensor, a motion sensor and other sensors. Particularly the optical sensor can include an ambient optical sensor and a proximity sensor, where the ambient optical sensor can adjust the brightness of the display panel according to the luminosity of ambient light rays, and the proximity sensor can power off the display panel and/or a backlight when the terminal 6000 moves nearby an ear. A gravity acceleration sensor which is one motion sensor can detect the magnitudes of accelerations in respective directions (typically three axes) and can detect the magnitude and the direction of gravity when the sensor is stationary and can be configured to perform applications of identifying the posture of a mobile phone (e.g., switching between landscape and portrait modes, relevant games, calibration of the posture of a magnetometer, etc.), a relevant function of identifying vibration (e.g., a pedometer, a knock, etc.), etc.; and the terminal 6000 can be fluffier configured with a gyroscope, a barometer, a hygrometer, a thermometer, an infrared sensor and other sensors, and a repeated description of these components will be omitted here.

The audio circuit, a speaker and a microphone can provide an audio interface between the user and the terminal 6000. The audio circuit can convert received audio data into an electric signal and transmit the electric signal to the speaker, which is convened by the speaker into an audio signal for output; and on the other hand, the microphone converts a collected audio signal into an electric signal which is received by the audio circuit and then converted into audio data, and the audio data is further output to the processor for processing and then transmitted to another apparatus through the radio frequency circuit, for example, or the audio data is output to the memory for farther processing. The audio circuit may fluffier include an earphone jack for communication between a peripheral earphone and the terminal 6000.

The WiFi is a technology of short-range wireless transmission, and the terminal 6000 can assist the user in receiving and transmitting an e-mail, browsing a webpage, accessing streaming media, etc., through the WiFi module, and the user is provided with a wireless access to the broadband Internet by the WiFi module. Although the WiFi module is illustrated in this embodiment, it can be appreciated that the WiFi module may not be necessarily required for the terminal 6000 but can be omitted as desired without departing from the scope of the disclosure.

The processor is a control component of the terminal 6000, has the respective components connected by various interfaces and lines, and runs or executes the software programs and/or modules stored in the memory and invokes the data stored in the memory to perform the various functions of the terminal 6000 and process the data to thereby manage and control the terminal as a whole. Optionally the processor can include one or more processing cores; and optionally the processor can be integrated with an application processor and a modem processor, where the application processor generally handles the operating system, the user interfaces, the applications, etc., and the modem processor generally handles wireless communication. As can be appreciated, the modem processor above may not be integrated into the processor.

The terminal 6000 further includes a power source (e.g., a battery) powering the respective components, and optionally the power source can be logically connected with the processor through a power management system to thereby perform charging and discharging, management, power consumption management, etc., through the power management system. The power source can further include one or more DC or AC power sources, recharging systems, power source failure detection circuits, power source transformers or inverters, power source status indicators and any other components.

Although not illustrated, the terminal 6000 can further include a camera, a Bluetooth module, etc., and a repeated description thereof is omitted here. Particularly in this embodiment, the display device of the terminal 6000 is a touch screen display, and the terminal 6000 further includes a memory and one or more programs stored in the memory and configured to be executed by one or more processors. The one or more programs can perform the method in FIG. 1 or FIG. 3 or FIG. 4.

In another embodiment of the disclosure, there is provided a storage medium (including but not limited to a magnetic-disk memory, a CD-ROM, an optical memory, etc.) in which instruction codes are stored, where the instruction codes can are executed to perform the method in FIG. 1 or FIG. 3 or FIG. 4.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for reducing network resources required when pushing a message from a server to a terminal, the method comprising:
    determining, by the server, that a push message should be pushed to the terminal;
    determining, by the server, whether a first port of the terminal for receiving the push message is offline according to a list of services in the server, wherein information communicated over the first port conforms to a first protocol;
    if the first port of the terminal is determined to be offline by the server:
        sending, by the server, a notification message to a listening port of the terminal, wherein information communicated over the listening port conforms to a second protocol, wherein the first protocol utilizes more network resources than the second protocol;
        in response to receipt of the notification message, changing, by the terminal, a state of the first port to online to thereby establish a connection with the server via the first port;
        receiving, by the terminal, the push message from the server via the connection; and
        after reception of the push message, changing, by the terminal, the state of the first port to offline immediately or after a preset period of time to thereby terminate the connection;
    if the first port is determined to be online by the server:
        receiving, by the terminal, the push message from the server via the connection; and
        after reception of the push message, changing, by the terminal, the state of the first port to offline immediately or after a preset period of time to thereby terminate the connection.

2. The method according to claim 1, wherein changing, by the terminal, the state of the first port to offline after the preset period of time comprises:
    after reception of the push message from the server, starting, by the terminal, a timer; and
    if the timer expires, terminating the connection; or
    if the timer does not expire and the terminal receives additional information from the server over the connection, resetting the timer to thereby maintain the connection.

3. The method according to claim 1, wherein before sending the notification message from the server, the method further comprises:
    configuring, by the terminal, the listening port and transmitting identification information of the listening port to the server, wherein the identification information of the listening port comprises any one or combination of identification information of the terminal, IP address of the terminal and listening port number.

4. The method according to claim 1, wherein after the terminal establishes the connection with the server, the method further comprises transmitting, by the terminal and to the server, an indication that the first port is online.

5. The method according to claim 1, wherein after the connection with the server is established, the method further comprises:
    transmitting, by the terminal and to the server, an indication that the first port will be changed to offline before the terminal disconnects the connection.

6. The method according to claim 1, wherein before disconnecting, by the terminal, a last connection with the server, the method comprises updating a status of the terminal in the list of services in the server to be offline.

7. A terminal, comprising:
    a network interface that defines a first port for receiving push messages and a listening port, wherein information communicated over the first port conforms to a first protocol and information communicated over the listening port conforms to a second protocol, wherein the first protocol utilizes more network resources than the second protocol;
    a processor in communication with the network interface; and
    non-transient computer readable media coupled to the processor and having instruction code stored thereon for causing the processor to perform acts comprising:
        when the first port is offline:
            receiving, via the listening port, a notification message from a server, wherein the notification message is communicated by the server after the server determines that a push message should be pushed to the terminal and that the first port of the terminal for receiving the push message is offline;
            in response to receipt of the notification message, changing the state of the first port to online to thereby establish a connection with the server via the first port;
            receiving the push message from the server via the connection; and
            after reception of the push message, changing the state of the first port to offline immediately or after a preset period of time to thereby terminate the connection;
        when the first port is online:
            receiving the push message from the server via the connection; and
            after reception of the push message, changing the state of the first port to offline immediately or after a preset period of time to thereby terminate the connection.

8. The terminal according to claim 7, wherein in changing the state of the first port to offline after the preset period of time, the instruction code causes the processor to perform acts comprising:
   starting a timer after reception of the push message from the server; and
   if the timer expires, terminating the connection; or
   if the timer does not expire and the terminal receives additional information from the server over the connection, resetting the timer to thereby maintain the connection.

9. The terminal according to claim 7, wherein before receiving the notification message, the instruction code causes the processor to perform acts comprising:
   configuring the listening port and transmitting identification information of the listening port to the server, wherein the identification information of the listening port comprises any one or combination of identification information of the terminal, IP address of the terminal and listening port number.

10. The terminal according to claim 7, wherein after the connection with the server is established, the instruction code causes the processor to transmit an indication to the server that the first port is online.

11. The terminal according to claim 7, wherein after the connection with the server is established, the instruction code causes the processor to transmit an indication that the first port is offline before disconnecting the connection.

12. A system comprising a server and a terminal with a listening port, wherein,
   the server is configured to:
      determining that a push message should be pushed to the terminal;
      determining whether a first port of the terminal for receiving the push message is offline according to a list of services in the server, wherein information communicated over the first port conforms to a first protocol; and
      if the first port of the terminal is determined to be offline:
         send a notification message to a listening port of the terminal, wherein information communicated over the listening port conforms to a second protocol, wherein the first protocol utilizes more network resources than the second protocol;
   the terminal is configured to listen to:
      if the first port of the terminal is offline:
         in response to receipt of the notification message, change a state of the first port to online to thereby establish a connection with the server via the first port;
      if the first port of the terminal is online:
         receive the push message from the server via the connection, and
         after reception of the push message, change the state of the first port to offline immediately or after a preset period of time to thereby terminate the connection.

13. The system according to claim 12, wherein the terminal is configured to disconnect the connection after a preset period of time after reception of the information transmitted from the server by:
   starting a timer after reception of the push message; and
   if the timer expires, terminating the connection; or
   if the timer does not expire and the terminal receives additional information from the server over the connection, setting the timer to thereby maintain the connection.

14. The system according to claim 12, wherein before the terminal receives the notification message, the terminal is configured to configure the listening port and transmit identification information of the listening port to the server, wherein the identification information of the listening port comprises any one or combination of identification information of the terminal, IP address of the terminal and listening port number.

15. The system according to claim 12, wherein after the terminal establishes the connection with the server, the terminal is configured to transmit an indication to the server that the first port is online.

16. The system according to claim 12, wherein after the terminal establishes the connection with the server, the terminal is configured to transmit an indication to the server that the first port is offline before the terminal terminates the connection.

17. The system according to claim 12, wherein before the terminal terminates a last connection with the server, the server is configured to update a status of the terminal in the list of services in the server to be offline according to the status information.

* * * * *